United States Patent
Schafer et al.

[15] 3,656,635
[45] Apr. 18, 1972

[54] UNSTACKING AND SORTING OF BRICKS

[72] Inventors: Karl Schafer; Dieter Keck, both of Laggenback/Westphalia, Germany

[73] Assignee: C. Keller U. Co., Laggenback/Westphalia, Germany

[22] Filed: Nov. 17, 1970

[21] Appl. No.: 90,336

[30] Foreign Application Priority Data

June 29, 1970 Germany..................P 20 31 996.4

[52] U.S. Cl..........................................214/8.5 C, 214/1 Q
[51] Int. Cl......................................................B65g 59/02
[58] Field of Search......................214/8.5 C, 8.5 R, 6 A

[56] References Cited

UNITED STATES PATENTS 3,388,815  6/1968  Lingl.................................214/6 A
3,487,959  1/1970  Pearne...............................214/6 A Primary Examiner—Gerald M. Forlenza
Assistant Examiner—George F. Abraham
Attorney—Mason, Mason & Albright

[57] ABSTRACT

Apparatus for unstacking and sorting bricks which have been fired to various tones comprises grippers which remove layers of bricks from a number of stacks and deposit the bricks on first conveyors. The first conveyors feed the bricks to devices which align transverse rows of bricks and turn the bricks over. The bricks are then fed by second conveyors and thence by third conveyors extending transversely to the second conveyor. Group of bricks are lifted from the third conveyors and are deposited on a selected fourth conveyor which feeds the groups of bricks to a respective packing station.

8 Claims, 2 Drawing Figures

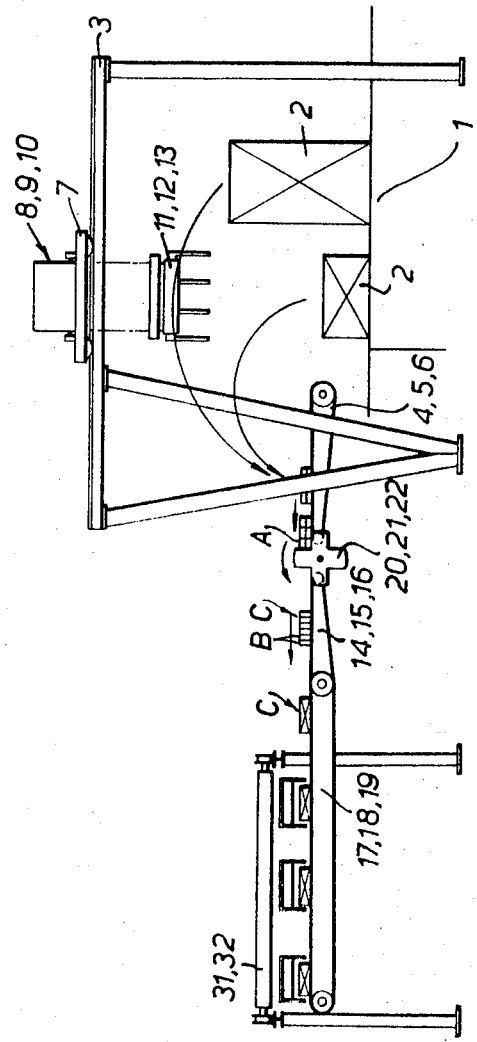

UNSTACKING AND SORTING OF BRICKS

FIELD OF THE INVENTION

The present invention relates to the unstacking and sorting of bricks that have been fired to a variety of tones in a reducing atmosphere.

SUMMARY OF THE INVENTION

According to the present invention, there is provided apparatus for unstacking bricks from stacks of bricks each stack having a plurality of layers of bricks, said apparatus comprising first conveying means, removing means operable to remove layers of bricks from the stacks and to deposit said removed layers on said first conveying means, second conveying means, means operable to align transverse rows of bricks in said removed layers fed by said first conveying means to turn said aligned rows of bricks over and deliver said aligned rows of bricks to said second conveying means, third conveying means extending transversely to said second conveying means, lifting means operable to lift groups of bricks from said second conveying means and to feed said groups onto said third conveying means, fourth conveying means extending transversely to said third conveying means, means operable to lift bricks from said third conveying means and to deliver said bricks onto said fourth conveying means, and packing station means, said fourth conveying means being operable to deliver said bricks to said packing station means.

BRIEF DESCRIPTION OF THE DRAWINGS

An embodiment of the invention will now be described by way of example only with reference to the accompanying diagrammatic drawings in which:

FIG. 2 is a side elevation of the apparatus shown in FIG. 1.

DESCRIPTION OF THE PREFERRED EMBODIMENT

Figure 1:
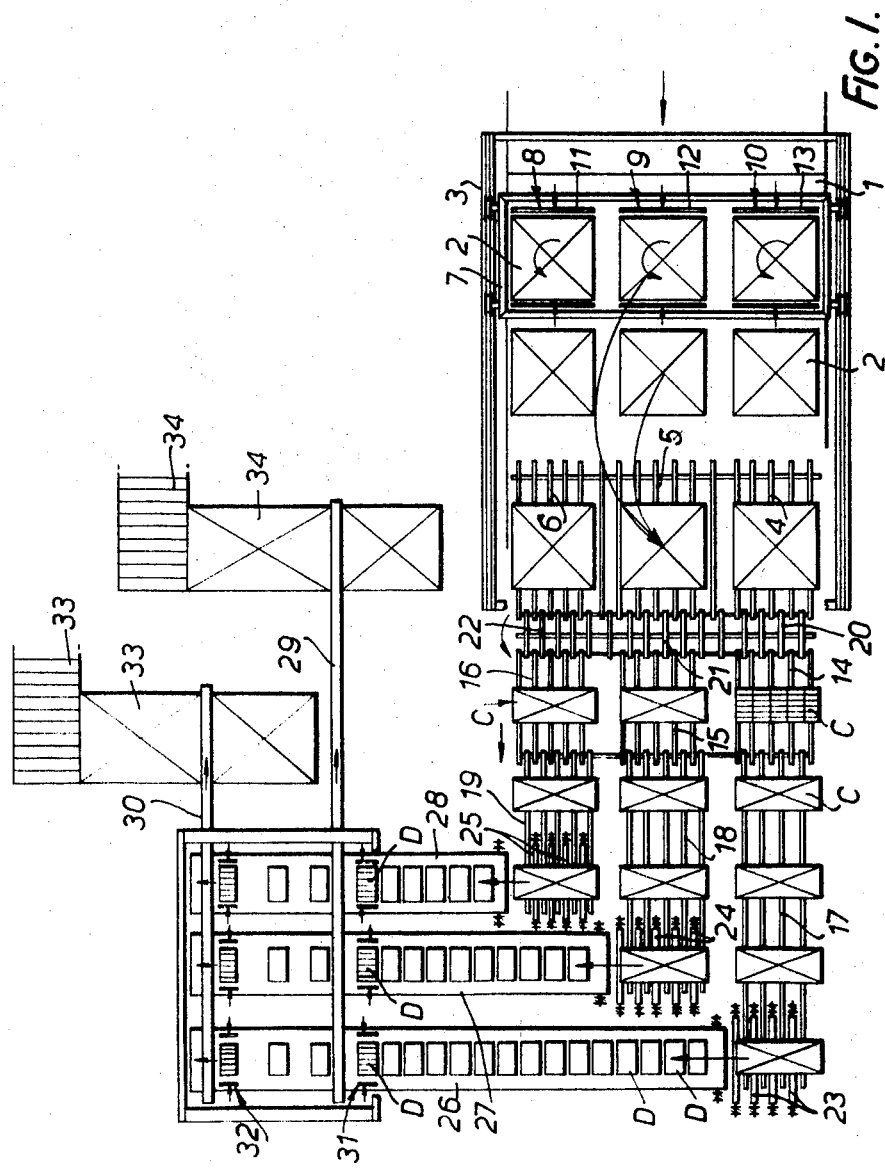
FIG. 1 is a plan of apparatus for unstacking and sorting bricks in accordance with the invention.

As shown in the drawings kiln trucks 1 deliver bricks in the form of loose stacks 2, which have been fired in a reducing atmosphere.

An overhead track 3 bridges the trucks 1 and first conveyors 4, 5 and 6, each consisting of individual narrow belts and arranged in front of the trucks 1.

Running on the track 3 is an overhead trolley 7, equipped with three gripper units 8, 9 and 10, which can travel at right angles to the direction of travel of the trolley 7 along the track 3. Each of the gripper units 8, 9 and 10 comprises a pair of gripping jaws 11, 12 and 13 respectively, which can be raised and lowered and turned through 90° about a substantially vertical axis. While the grippers 11, 12 and 13 are being turned through 90°, the gripper units 8, 9 and 10 are moved relatively apart, to prevent the respective pairs of jaws 11, 12 and 13 from colliding with one another.

The conveyors 4, 5 and 6 are followed by second conveyors 14, 15 and 16, and these by third conveyors 17, 18 and 19, likewise consisting of individual narrow belts.

Between the conveyors 4, 5 and 6 and 14, 15 and 16 are cruciform-sectioned orientating devices 20, 21 and 22 respectively extending transversely thereto. The orientating devices which are rotatable about axes extending transversely to the conveyors 4, 5 and 6 receive the bricks as these arrive stacked on their broad faces, bring the transverse rows into proper alignment and turn them through 90° in such a way that they come to rest on their narrow side faces on the next set of conveyors.

Between the individual narrow belts at the ends of the conveyors 17, 18 and 19 are rollers 23, 24 and 25, which can be raised and lowered, so that the bricks delivered thereto can be pushed off, at right angles to the direction of motion of the conveyors 17, 18 and 19, onto fourth conveyors 26, 27 and 28.

The conveyors 26, 27 and 28 deliver the bricks to one of two conveyors 29 and 30, running at right angles to the direction of motion of the conveyors 26, 27 and 28 and arranged above the latter. Each of the conveyors 29 and 30 has an associated gripper unit 31 and 32 respectively, which picks up a row of bricks and deposits it on the conveyor 29 or 30, as the case may be, by a combination of lift-and-lower and translational movements.

The conveyors 29 and 30 deliver the bricks to packing stations 33 and 34 respectively, where they are stacked into groups and then steel-banded or provided with shrunk-on hoods or bonnets.

The mode of operation of the apparatus is as follows:

The stacks 2 of fired bricks on the kiln trucks 1 comprise layers of bricks lying on their broad faces. To prevent the stacks 2 from toppling, each pair of layers is offset at 90° in relation to adjacent pairs of layers so as to form a criss-cross bond.

The bricks have been fired in a reducing atmosphere in a kiln (not shown) and the temperature variations within the kiln will have produced differently toned bricks within the individual stacks 2; in other words, the tone of the bricks will be dependent upon their respective positions in the kiln during firing and thus upon their height in the stacks 2.

To produce uniform tone distribution in a wall during house-building, it is necessary for the bricks, upon removal from the stack, to be sorted or intermingled in such a way that the bricks of various tones are well interspersed in the groups of bricks formed at the packing stations 33,34.

Each respective pair of layers is therefore removed from the stacks 2 alternately by the grippers 11, 12 and 13, according to the toning of the bricks, and deposited on the conveyors 4, 5 and 6. Since adjacent pairs of layers of bricks in the stacks have been turned through 90°, alternate pairs of layers must be rotated back through 90°, by the gripper units 8, 9 and 10 so that all the bricks are orientated in the same sense.

When the jaws 11, 12 and 13 carry out the appropriate movements, the gripper units 8, 9 and 10 move apart to ensure that the respective jaws 11, 12 and 13 do not collide with one another. After this movement, the gripper units 8, 9 and 10 return to their former positions and the pairs of layers held by the jaws 11, 12 and 13 are deposited on the conveyors 4, 5 and 6. The gripper units 8, 9 and 10 carry out this movement while the trolley 7 is travelling from the kiln truck 1 to the position at which the pairs of layers are deposited on the conveyors 4, 5 and 6. Each of the grippers 11, 12 and 13 serves its corresponding conveyor 4, 5 and 6 respectively.

The conveyors 4, 5 and 6 carry the bricks, with their cut faces i.e. their broad faces facing downwardly to the orientating devices 20, 21 and 22, which align each transverse row A of bricks, rotate them through 90° and deliver them onto the conveyors 14, 15 and 16, so that the bricks are supported on their narrow faces. In each quarter revolution the devices 20, 21 and 22, one transverse row A of bricks comprising two superimposed layers, is rotated and transferred, so that the bricks come to rest on the next conveyors 14, 15 and 16, in two transverse rows B.

On each of the conveyors 14, 15 and 16, a group C of bricks is formed, consisting, for example, of six transverse rows B, as a result of bricks being fed continuously by the devices 20, 21 and 22, this action governing the speeds of the groups of conveyors 4, 5 and 6 and 14, 15 and 16. It is possible for the conveyors to be run either at the same speed or at different speeds.

The groups C formed on the conveyors 14, 15 and 16 are then delivered on to the conveyors 17, 18 and 19, which are driven faster than the conveyors 14, 15 and 16, so that substantial gaps are produced between consecutive groups C.

As soon as the groups C reach the end of the conveyors 17, 18 and 19, the rollers 23, 24 and 25 located between the narrow belts are raised and set in motion, so that the bricks are thrust by the rollers on to the conveyors 26, 27 and 28, arranged at right angles to the direction of motion of the conveyors 17, 18 and 19, in such a way that the longitudinal rows D in the groups C are deposited spaced apart on these conveyors 26, 27 and 28. The spacing out of the longitudinal rows D can be achieved either by running the conveyors 26, 27 and 28 at a higher speed than the conveyors 23, 24 and 25 or by intermittently stopping the rollers 23, 24 and 25 while the conveyors 26, 27 and 28 continue to run.

These conveyors 26, 27 and 28 deliver the bricks to adjacent the conveyors 29 and 30, which are spaced apart, above and at right angles to the conveyors 26,27 and 28. The gripper units 31 and 32 associated with the conveyors 29 and 30 respectively, lifts up a selected longitudinal row D of bricks and deposits in on the conveyor 29 or 30, accordingly. Each gripper unit 31, 32 comprises three pairs of gripping jaws, one pair associated with a respective one of the conveyors 26, 27, 28.

The conveyors 29 and 30 then feed the bricks to the packing stations 33 and 34 respectively to be stacked into groups.

The apparatus ensures that each group of bricks formed at the packing stations contains bricks of intermixed tones.

What is claimed is:

1. Apparatus for unstacking bricks from stacks of bricks and each stack having a plurality of layers of bricks, said apparatus comprising
   first conveying means,
   removing means operable to remove layers of bricks from the stacks and to deposit said removed layers on said first conveying means,
   second conveying means,
   means operable to align transverse rows of bricks in said removed layers fed by said first conveying means with the bricks presenting one surface to the first conveyor, to turn said aligned rows of bricks about their horizontal axes and deliver said aligned rows of bricks so that they present a second surface to said second conveying means,
   third conveying means extending transversely to said second conveying means
   lifting means operable to lift groups of bricks from said second conveying means and to feed said groups onto said third conveying means
   fourth conveying means extending transversely to said third conveying means
   means operable to lift bricks from said third conveying means and to deliver said bricks onto said fourth conveying means, and
   packing station means, said fourth conveying means being operable to deliver said bricks to said packing station means.

2. Apparatus according to claim 1 wherein said first conveying means comprises
   a first plurality of conveyors, and wherein said second conveying means comprises
   a second plurality of conveyors, each said conveyor of said first plurality being aligned with a respective conveyor in said second plurality.

3. Apparatus according to claim 1 wherein the said means for aligning turning over and delivering rows of bricks comprises
   a cruciform cross-sectioned device which extends transversely to said first conveying means and which is rotatable about an axis extending transversely to said first conveying means.

4. Apparatus according to claim 1 wherein the said removing means is operable to rotate selected said removed layers through 90° about a substantially vertical axis.

5. Apparatus according to claim 1 wherein said fourth conveying means comprises
   a plurality of conveyors, and wherein said packing station means comprises
   a plurality of packing stations, each said packing station being associated with a respective one of said conveyors of said fourth conveying means.

6. Apparatus according to claim 1 wherein the said means operable to lift bricks from said third conveying means comprises
   means operable to grip said bricks and to deliver said bricks to a selected conveyor of said fourth conveying means.

7. Apparatus according to claim 1 wherein said third conveying means feeds said bricks at a faster rate than said second conveying means.

8. Apparatus according to claim 1 wherein said first, second and third conveying means each comprise
   a plurality of conveyors, each conveyor of said first conveying means being associated with a respective conveyor of said second and third conveying means, and each conveyor of said first conveying means being associated with a respective stack of bricks, wherein said fourth conveying means comprises
   a plurality of conveyors, and wherein the said lifting means operable to lift bricks from said third conveying means comprises means operable to grip said bricks and to deliver said bricks to a selected conveyor of said fourth conveying means.

* * * * *